Dec. 20, 1960   F. D. BARTON   2,965,096
EXPENDABLE BARBECUE
Original Filed May 31, 1955

INVENTOR.
FRANK D. BARTON
BY C. G. Stratton
ATTORNEY

United States Patent Office 2,965,096
Patented Dec. 20, 1960

2,965,096

EXPENDABLE BARBECUE

Frank D. Barton, Tarzana, Calif., assignor, by mesne assignments, to John S. Williams, Long Beach, J. R. Biven, San Pedro, and Leland B. Irish, Long Beach, Calif.

Continuation of application Ser. No. 511,956, May 31, 1955. This application May 21, 1958, Ser. No. 736,924

3 Claims. (Cl. 126—25)

This invention relates to a barbecue that is expendable or disposable, and the present application is a continuation of my copending application Serial No. 511,956, filed May 31, 1955, and now abandoned.

It is an object of the present invention to provide a unitary, sealed device embodying a completely fueled barbecue that, after use, may be discarded, the same being efficient for the purpose intended and yet so inexpensive to produce that expendability is economically feasible.

Another object of the invention is to provide a low-cost and efficient barbecue unit that is small and compact and, therefore, readily transportable to remote places of use as, for instance, to the beaches, camp sites, etc., where the same may be used and then discarded to obviate re-transporting from such remote places back to the home.

A further object of the invention is to provide a compact, sealed and completely fueled cooking unit that is safe for use in the home or other enclosed places and, while embodying fuel and tinder, is capable of clean handling in any suitable environment.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the invention, which is given by way of illustration or example only.

In the drawing, like reference characters designate similar parts in the several views.

Figure 1:
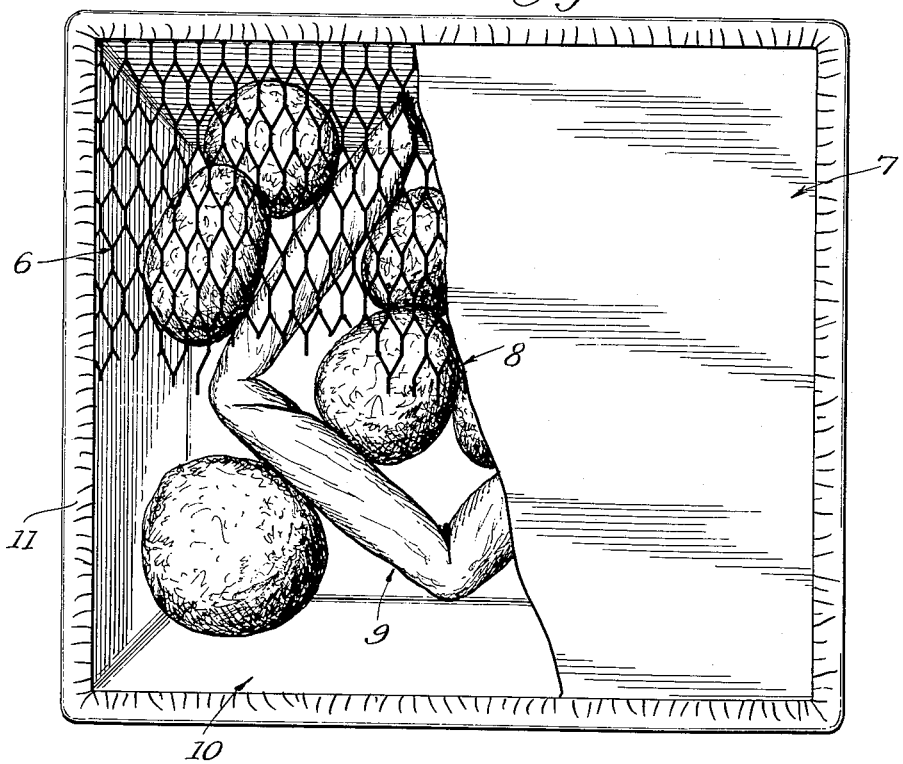
Fig. 1 is a plan view partly broken away, of an expendable or disposable barbecue embodying the features of the present invention.
Figure 2:
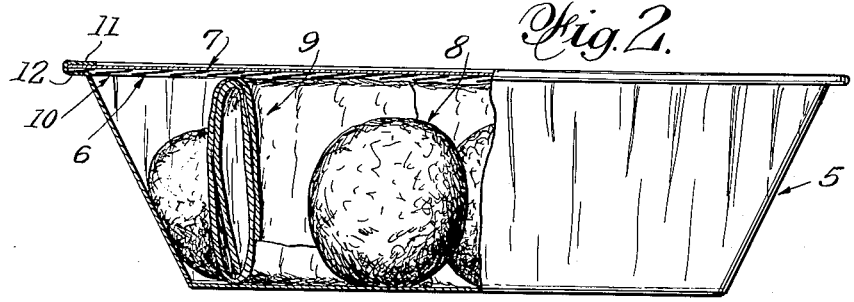
Fig. 2 is a side elevational view, in quarter section.
Figure 3:
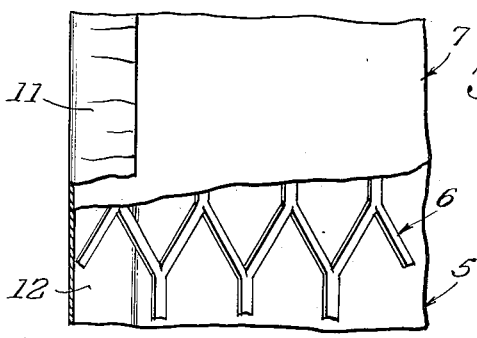
Fig. 3 is an enlarged fragmentary plan view showing the features of the invention in greater detail.

The barbecue that is illustrated comprises, generally, a housing 5, a grill 6 carried by said housing, a removable sealing cover 7 over said grill, and a quantity of fuel 8 and tinder 9 within said housing.

The housing may be variously shaped and has an open top 10 framed by marginal beads or folds 11. Said housing is advantageously made of heavy metal foil of a weight or thickness that is form-retaining. In this case, said housing is formed as a shallow dish-shaped, open-topped enclosure that has upwardly flared sides, substantially as shown. The open edge of the housing is preferably provided with a peripheral ledge 12.

The grill 6 is disposed to span across the open top of the housing 5 and be supported upon the peripheral ledge 12 of said housing. Any suitable reasonably stiff grill may be used. The one shown comprises expanded metal that has a multiplicity of openings therein. Wire screening may be advantageously used, also. Thus, the open top of the housing is provided with a light and rigid metallic food-supporting grill.

The sealing cover 7 preferably is made of paper and the same may be imprinted with display matter as well as instructions for use of the barbecue. Said cover is substantially coincidental in size with the grill and, therefore, completely encloses the interior of the housing 5.

The marginal folds 11 cooperate with peripheral ledge 12 to clinch the peripheral edges of the grill and paper cover to effectively enclose or seal in the interior of the housing 5.

The fuel 8, in this instance, comprises a number of molded briquettes such as conventionally used as fuel in barbecues and the like. Coal dust with a suitable binder comprises one form of such briquettes. Other processed units of coal or other combustible material may be used.

The tinder 9 is shown as a substantially flat roll or strip of easily ignitable material, such as impregnated paper, the same being flattened and bent or folded to fit within the housing 5 between the bottom thereof and the grill 6. By so forming the tinder 9, the briquettes are separated into several groups substantially uniformly distributed in the housing. Thus, when the tinder is ignited, the same produces a flame that substantially simultaneously ignites the fuel briquettes.

The housing 5 is initially formed with the folds 11 opened upwardly, enabling placing of the grill and paper cover upon ledge 12 after the fuel and tinder have been placed within said housing. The folds 11 are then clinched over the margins of said grill and cover to provide the present sealed unit.

The barbecue is readied for use by tearing away the cover 7 and, with a match or other lighted wick, inserted through an opening in the grill, the tinder 9 may be ignited and the latter, in a short while, ignites the briquettes which provide the cooking heat.

It will be obvious that items to be cooked, placed on grill 6, will be cooked with minimum of fuss and bother. After the fuel has been consumed, the unit may be discarded as above indicated.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

I claim:

1. A completely self-contained, expendable barbecue unit, including: a plurality of pieces of solid fuel positioned in a single layer; an elongated tinder strip threaded among the pieces of solid fuel in serpentine fashion, said tinder strip being a substantially flat strip which is disposed on edge throughout its entire length and the thickness of which is small as compared to its width, said tinder strip extending from the bottom of said layer of pieces of solid fuel at least to the top of said layer; and noncombustible means enclosing the pieces of solid fuel and said tinder strip and having a bottom and a top, said pieces of solid fuel and said tinder strip resting on said bottom and said tinder strip extending upwardly to a level adjacent said top.

2. A completely self-contained, expendable barbecue unit, including: a shallow, dish-shaped, open-topped housing of metal foil having bottom and side walls; a plurality of pieces of solid fuel positioned in said housing in a single layer and resting on said bottom wall thereof; an elongated tinder strip threaded among the pieces of solid fuel in serpentine fashion, said tinder strip being a substantially flat strip which is disposed on edge throughout its entire length and the thickness of which is small as compared to its width, the lower edge of said tinder strip resting on said bottom wall of said housing and the upper edge of said tinder strip being above said layer of pieces of solid fuel; and a grill seated on said housing and located adjacent said upper edge of said tinder strip, portions of the metal foil forming said housing being crimped over the peripery of said grill to secure it to said housing.

3. A completely self-contained, expendable barbecue unit, including: a shallow, dish-shaped, open-topped housing of metal foil having bottom and side walls; a plurality of pieces of solid fuel positioned in said housing in a single layer and resting on said bottom wall thereof; an elongated tinder strip threaded among the pieces of solid fuel in serpentine fashion, said tinder strip being a substantially flat strip which is disposed on edge throughout its entire length and the thickness of which is small as compared to its width, the lower edge of said tinder strip resting on said bottom wall of said housing and the upper edge of said tinder strip being adjacent the top of said layer of pieces of solid fuel; and a grill seated on said housing and located above and adjacent said upper edge of said tinder strip and above and adjacent said layer of pieces of solid fuel, portions of the metal foil forming said housing being crimped over the periphery of said grill to secure it to said housing.

References Cited in the file of this patent
UNITED STATES PATENTS

| | | |
|---|---|---|
| 421,917 | Farrel | Feb. 25, 1890 |
| 465,666 | Hulmes | Dec. 22, 1891 |
| 525,912 | Ludde | Sept. 11, 1894 |
| 857,063 | Hofmann | June 18, 1907 |
| 2,101,180 | Jacobs | Dec. 7, 1937 |
| 2,212,157 | Fernholtz | Aug. 20, 1940 |
| 2,548,379 | Lammersen | Apr. 10, 1951 |
| 2,811,428 | Smith | Oct. 29, 1957 |
| 2,834,661 | Chaplin | May 13, 1958 |
| 2,842,116 | Hinderer | July 8, 1958 |
| 2,918,051 | Broman | Dec. 22, 1959 |

OTHER REFERENCES

Article regarding the Broman Grill in "Aluminum Progress," published by the Reynolds Metals Co., volume 45, only page 6 relied on.